(12) United States Patent
Waidelich et al.

(10) Patent No.: US 10,872,165 B2
(45) Date of Patent: Dec. 22, 2020

(54) APPARATUS AND METHOD FOR PROVIDING A SECURE DATABASE ACCESS

(71) Applicant: SIEMENS AKTIENGESELLSCHAFT, Munich (DE)

(72) Inventors: Fabienne Waidelich, Munich (DE); Igor Liebermann, Munich (DE)

(73) Assignee: SIEMENS AKTIENGESELLSCHAFT ( * ) Notice: Subject to any disclaimer, the term of this patent is extended or adjusted under 35 U.S.C. 154(b) by 0 days.

(21) Appl. No.: 16/609,057

(22) PCT Filed: Apr. 10, 2018

(86) PCT No.: PCT/EP2018/059123
§ 371 (c)(1),
(2) Date: Oct. 28, 2019

(87) PCT Pub. No.: WO2018/206210
PCT Pub. Date: Nov. 15, 2018

(65) Prior Publication Data
US 2020/0202031 A1 Jun. 25, 2020

(30) Foreign Application Priority Data
May 10, 2017 (EP) .................................... 17170463

(51) Int. Cl.
G06F 21/62 (2013.01)
G06F 16/25 (2019.01)
(Continued)

(52) U.S. Cl.
CPC ........ G06F 21/6218 (2013.01); G06F 16/252 (2019.01); G06F 21/31 (2013.01); G06F 21/602 (2013.01); G06F 21/725 (2013.01)

(58) Field of Classification Search
CPC .... G06F 21/6218; G06F 21/31; G06F 21/602; G06F 16/252; G06F 21/725
See application file for complete search history.

(56) References Cited

U.S. PATENT DOCUMENTS 7,617,215 B2 * 11/2009 Provoost ............... G06F 16/954
7,817,646 B2 * 10/2010 Guan ................... H04L 65/1006
370/389
(Continued)

FOREIGN PATENT DOCUMENTS

CN 101895513 A 11/2010
CN 102739654 A 10/2012
(Continued)

OTHER PUBLICATIONS

International Search Report and Written Opinion of the International Searching Authority dated Jun. 13, 2018 for Application No. PCT/EP2018/059123.
(Continued)

Primary Examiner — J. Brant Murphy
(74) Attorney, Agent, or Firm — Schmeiser, Olsen & Watts LLP

(57) ABSTRACT

A system and method for providing a secure database access from an application program implemented on a client device located in a first to a database located in a second zone, which is outside of the first zone, applying a traditional database access application programming interface, wherein implementing an database access driver on the client device in the first zone and implementing an access proxy in a second zone, which is connected to the database, performing an authentication of a user of the application program via an authentication agent located on the database access driver and an authentication server, delivering a credential from the authentication server to the database access driver in case of a successful authentication, and enabling database access to
(Continued)

the user of the application program, if the credential is accepted by the database access proxy.

15 Claims, 2 Drawing Sheets

(51) Int. Cl.
*G06F 21/31* (2013.01)
*G06F 21/60* (2013.01)
*G06F 21/72* (2013.01)

(56) References Cited

U.S. PATENT DOCUMENTS

| | | | |
|---|---|---|---|
| 9,475,510 B2* | 10/2016 | Porsch | B61L 3/006 |
| 2001/0045451 A1* | 11/2001 | Tan | G07F 7/1008 |
| | | | 235/375 |
| 2003/0135505 A1* | 7/2003 | Hind | G06F 16/252 |
| 2005/0108521 A1* | 5/2005 | Silhavy | G06F 21/31 |
| | | | 713/156 |
| 2006/0041531 A1* | 2/2006 | Provoost | G06F 16/958 |
| 2007/0268912 A1* | 11/2007 | Guan | H04L 29/06027 |
| | | | 370/396 |
| 2013/0018841 A1* | 1/2013 | Adendorff | G06F 16/252 |
| | | | 707/602 |
| 2013/0282776 A1* | 10/2013 | Durrant | G06F 21/6281 |
| | | | 707/827 |
| 2014/0013400 A1* | 1/2014 | Warshavsky | H04L 63/10 |
| | | | 726/4 |
| 2015/0329128 A1* | 11/2015 | Porsch | B61L 27/04 |
| | | | 701/19 |
| 2015/0379257 A1* | 12/2015 | Ahmed | G06F 21/31 |
| | | | 726/19 |
| 2017/0295236 A1* | 10/2017 | Kulkarni | H04L 67/32 |

FOREIGN PATENT DOCUMENTS

| | | |
|---|---|---|
| CN | 104301316 A | 1/2015 |
| CN | 106295377 A | 1/2017 |

OTHER PUBLICATIONS

Non-English Chinese Office Action dated Apr. 20, 2020 for Application No. 201880030593.2.
Ma, Xin-Qiang:, "A design scheme for security database architecture", Information Technology, DOI: 10.13274/j.cnki.ndzj.2006.11. 003; 2006.
Non-English Chinese Notice of Allowance dated Aug. 4, 2020 for Application No. 201880030593.2.

* cited by examiner

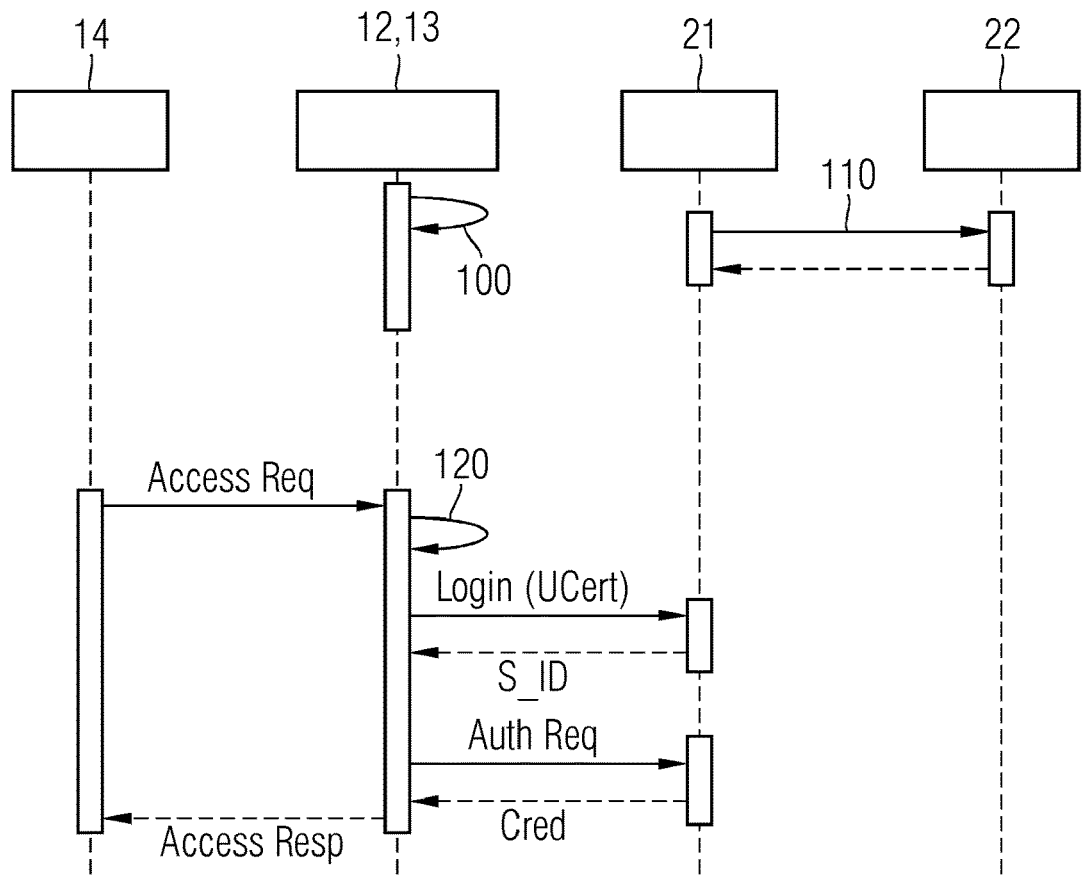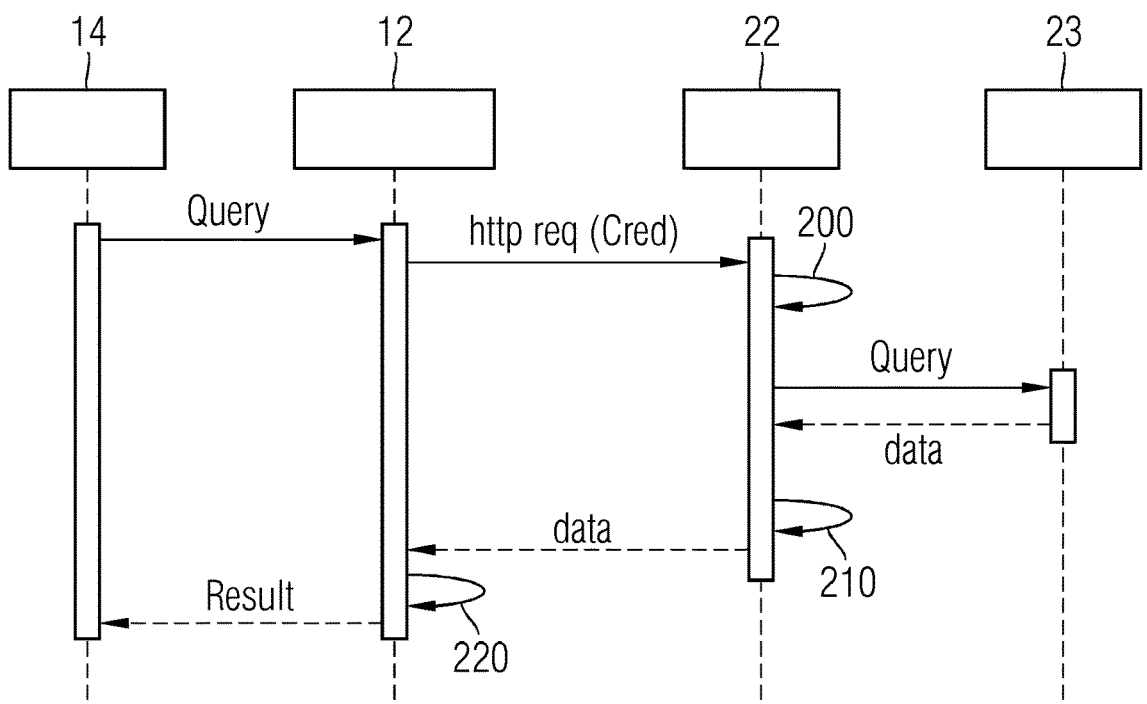

APPARATUS AND METHOD FOR PROVIDING A SECURE DATABASE ACCESS

CROSS-REFERENCE TO RELATED APPLICATIONS

This application claims priority to PCT Application No. PCT/EP2018/059123, having a filing date of Apr. 10, 2018, which is based on European Application No. 17170463.8, having a filing date of May 10, 2017, the entire contents both of which are hereby incorporated by reference.

FIELD OF TECHNOLOGY

The application is related to providing a secure database access from a client device located in a first zone to a database located in a second zone which is outside of the first zone using a traditional database access application programming interface providing only weak authentication means.

BACKGROUND

Databases and data warehouses usually contain valuable business assets and shall thus be deployed in backend network zones in order to protect them from attacks from outside. In this case access is allowed indirectly through front-end applications, i.e. via representational state transfer application protocol interfaces, in short REST APIs, e.g. the hypertext transport protocol http, which can be protected by state-of-the-art strong authentication mechanism, like e.g. smartcard-based authentication.

Open database connectivity, in short ODBC, is a well-known and widely used traditional standard application programming interface, in short API, for accessing database management systems, which was developed during the early 1990s and became a widely used interface to access databases. Similar Java database connectivity, in short JDBC, is an application protocol interface for the programming language Java, which defines how a client may access a database. It provides methods to query and update data in a database, especially relational databases like Structured Query Language (SQL) databases. A JDBC-to-ODBC-bridge enables connections to any ODBC-accessible data source in the Java virtual machine host environment. ODBC accomplishes data base management system independence by using an ODBC-driver as a translation layer between the application and the database management system. An application uses ODBC-functions through an ODBC driver manager with which it is linked, and the driver passes e.g. a query to the database management system. An ODBC driver can provide a standard set of functions for the application using and implementing database management systems specific functionality. An application that can use ODBC is referred to as "ODBC-compliant".

Direct ODBC/JDBC access to databases or data warehouses jeopardizes the security of databases as ODBC/JDBC only supports weak authentication based on username and password. Nevertheless, direct ODBC/JDBC access is sometimes required for various reasons. E.g. data scientists use ODBC/JDBC and are not willing to change their work approach. Also, legacy applications usually connect to data sources via ODBC/JDBC. Switching e.g. to http in order to connect to backend databases via a REST application program interface would require implementation efforts which require time and money. Moreover, in many cases, applications cannot be simply redesigned because they are e.g. too old or in productive use.

Further on, traditional standard ODBC/JDBC drivers require database credentials, the already mentioned username and password, to be stored on client side. If an attacker gets access to these credentials, e.g. by an attack of the client device/application or via social engineering, he or she gets access to the database or data warehouse located in backend on a backend side. A further drawback of a traditional ODBC/JDBC data base access lies in that a communication between client and database is not always encrypted. If some of the clients do not support encryption, it might not be possible to activate and deactivate encryption on backend side in a flexible way. In such a case protection of data in transit depends on the client and cannot be enforced on backend side.

To provide a strong authentication to access the database proprietary solutions exist but have a very limited area for application. Also, applications with REST interfaces can be realized in order to access databases located in backend using authentication standards for http communication like openID connect or security assertion markup language, SAML. However, such application protocol interfaces require programmatic changes of the sequential query language SQL clients, as communication takes place over http and not via ODBC/JDBC protocol messages.

SUMMARY

An aspect relates to a method or means to access a remote database located in a zone without direct control by traditional database access application programming interface like JDBC/ODBC in a secure way, especially using a strong authentication approach.

The first aspect of embodiments of the invention provides a method for a secure database access from an application program implemented on a client device located in a first zone to a database located in a second zone, which is outside the first zone. In a first method step a database access driver is implemented on the client device and a database access proxy is implemented on a second zone which is connected to the database. In further steps an authentication of a user of the application program is performed via an authentication agent located on the database access driver and an authentication server. Then the authentication server delivers a credential to the database access driver in case of a successful authentication. Database access will be granted to the application program, if the credential is accepted by the database access proxy.

Implementing a database access driver on a client device and implementing an access protocol proxy connected to the database in the second zone allows the access of the database via a traditional database access application programming interface providing weak authentication. An authentication agent implemented on the database access driver which communicates to an external authentication server, separates an authentication process from the database access process between database access driver and the database access proxy. The authentication performed between the authentication agent and the authentication server is a strong authentication using e.g. certificates and/or integrating means of an Identity and Access Management System. In addition, the credential delivered by the authentication can be used to set up a secure connection between the client device and the database access proxy and further to the database. Therefore, a more sophisticated authentication of the client device or more precise the user of the application on the client device can be performed without the drawbacks mentioned before and an encrypted connection can be established.

The credential can be an authentication token or an identity token or an authentication object.

In the further description the expression "access driver" is used as a synonym for "database access driver". The expression "access proxy" is used as a synonym for "database access proxy".

The user of an application program can be a person or a technical device. The expression "first zone" is used synonymously for "client zone", and "second zone" is used synonymously for "backend zone".

In an advantageous embodiment of the invention the database access application programming interface is a Java database connection JDBC or Open database connection ODBC, especially a JDBC Type 3.

This JDBC/ODBC API is a traditional, well known and often used to access databases. No programmatic changes of legacy applications are needed.

In a preferable embodiment of the method, the credential is a cryptographically secured credential.

Using a cryptographically secured credential enables to validate the integrity of the credential and to authenticate the sender, i.e. the authentication server.

In a preferred embodiment the database access application programming interface messages are transmitted via a secure connection between the database access driver and the database access proxy.

The setup of a secure connection between the database access driver and the database access proxy can be performed using the provided credential e.g. to set up a secure connection according to the transport layer security TLS protocol.

In a further preferred embodiment, the authentication server is located in the second zone or in a third zone other than the first or second zone, especially a central zone.

The authentication server provides an identity and access management service, which is available on the market based on state-of-the-art standards like openID Connect/open authentication OAuth or according to security assertion markup language SAML. Such an authentication server can be deployed locally in the secure second zone or centrally or on-premises or in a cloud.

In a preferred embodiment the database access protocol interface is performed by at least one vendor-specific driver in the database access proxy.

With the use of these vendor-specific drivers no proprietary solution for specific kind of databases or data warehouses is required.

In a further preferable embodiment, the access rights of a user requesting access to the database are checked on the database access proxy.

This checking of the access rights on the access proxy does not request the transfer of any user access rights via the access driver and proxy between different zones of security.

In a further embodiment access rights of the user of the application program requesting access to the database are stored in the database access proxy and the access rights are updated by the authentication server.

The access rights of a user of the application program requesting access to the database are administrated on the authentication server, especially in a repository connected to the authentication server.

Authentication servers usually provide access to a repository storing access rights. So, this repository can be reused to store the database access rights and no separate unit for storing the access rights is required. Alternatively access rights for entire user groups can be provided by the database itself. In this case the database requires information on the user group a user is belonging to.

In a preferred embodiment the application program is registered at the authentication server during application deployment on the client device.

The application program which uses the authentication agent is handled as additional application for which an identity and access management is provided by an identity and access management system.

In a preferable embodiment operation performed by the database access proxy are logged by a logging unit.

This enables monitoring by logging requests at the access proxy without depending on logging functionalities of the database or data warehouse.

In a preferred embodiment data is transmitted on a secure second connection between the access proxy and the database.

This secure second connection provides also the last section of the connection to be encrypted and therefore protected from manipulation.

A further aspect of embodiments of the present invention is a system providing a secure database access from an application program implemented on a client device in a first zone to a database located in a second zone different from the first zone, comprising
   a database access protocol interface driver including an authentication agent, the database access driver being implemented on the client device in the first zone,
   a database access proxy being connected to a database and located in the second zone, wherein the database access protocol driver and the database access proxy are implemented for
      Performing an authentication of a user of an application program via an authentication agent located on the database access protocol interface driver and an authentication server,
      Delivering a credential from the authentication server to the database access protocol interface driver in case of a successful authentication, and
      Enabling database access to the user of the application program if the credential is accepted by the database access proxy.

The access driver and access proxy are implemented to perform a method according the previously described method.

Furthermore, a computer program product (non-transitory computer readable storage medium having instructions, which when executed by a processor, perform actions) is suggested which is loadable in the internal memory of a digital computer comprising software code portions for performing the steps of the method as described herein and when the product is run on a computer. The computer program product may be in the form of a USB-stick, a CD-ROM, a DVD or a downloadable file which can be transferred wireless or wired via communication network.

BRIEF DESCRIPTION

Some of the embodiments will be described in detail, with reference to the following figures, wherein like designations denote like members, wherein:

FIG. 3 shows a sequence diagram for an embodiment of the inventive method authenticating a user of an application implemented on the client device; and FIG. 4 shows a sequence diagram of an embodiment of an inventive database query after authentication according to FIG. 3.

DETAILED DESCRIPTION

Figure 1:
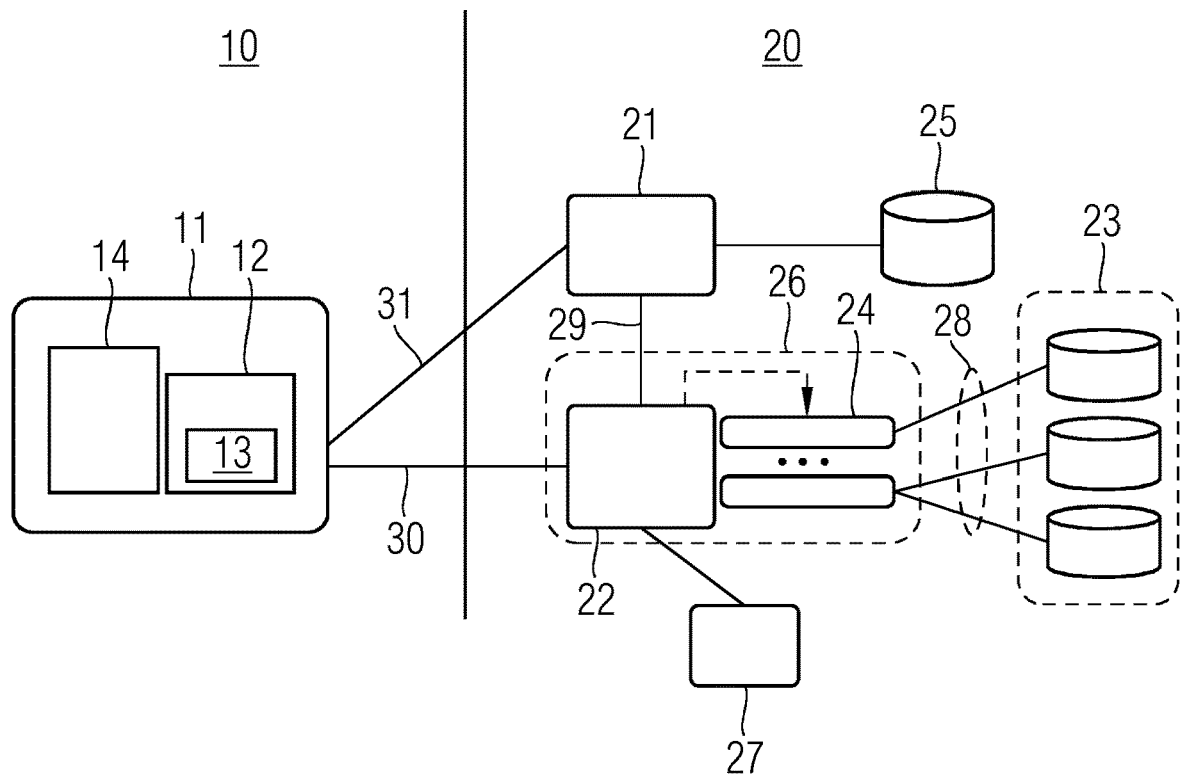
FIG. 1 shows a schematic view of network scenario applying the inventive system for accessing a database.

FIG. 1 shows a network scenario in which an application performs a database access using a database access protocol interface e.g. to query data from a database or data warehouse according the inventive method and using an embodiment of the inventive system. The application 14 is implemented on a client device 11 located in a first zone 10, e.g. a computer located in a private or public network. A database 23 providing data is located in a second zone 20, which is physically separated from the client device 11 in zone 10. The database 23 may comprise several logically separate partitions or several physically separated databases as shown in FIG. 1. The database 23 is located in a backend service zone comprising of servers providing various services and connected via external connections, e.g. 30 and 31, to the first zone 10. In the further description the first zone comprising the client device is also called client zone, the second zone 20 comprising an access protocol proxy 22 and the database is also called backend zone.

Using traditional database access application programming interfaces, in short database called access APIs, like open database connectivity ODBC or Java database connectivity protocols JDBC, in such a scenario, where a client device 11 and database 23 are located remotely from each other and connected via external connections 30, shows following drawbacks:

Security functions of traditional database access APIs, e.g. ODBC JDBC, are based on security information consisting of username and password pair. An ODBC/JDBC driver located in a client device 11 requires such security information to be stored on the client's side. If an attacker gets access to these information pairs, e.g. by an attack of the client device 11, the attacker gets access to the database 23.

Further on, an encryption of the data communication from the database 23 to the client device 11 cannot be enforced by the backend side 20. If the client device 11 does not support encryption it might not be possible to activate and deactivate encryption on the backend side 20 in a flexible way.

To use a traditional database access API and support stronger authentication using more sophisticated credentials and cryptographic functions an access driver 12 is implemented on the client device 11 in the first zone. In the second zone 20 a secure access proxy 22 is implemented on the server's side in a second zone. Access driver 12 and access proxy 22 are both e.g. JDBC Type 3 client and server components. The access proxy 22 communicates with vendor-specific access drivers 24 which provide the access to the database 23. The access proxy 22 and vendor-specific access drivers 24 are implemented on one device, e.g. a backend server 26. A database 23 can comprise several database components as shown or may comprise only one database. The database can also be a data warehouse comprising data from different sources and being used for reporting and data analysis.

To provide authentication by more sophisticated authentication methods, e.g. based on a public key infrastructure using certificates an authentication agent 13 is implemented in the access driver 12 on the client side which communicates with an authentication server 21 providing strong authentication means, especially identity and access management functions. The authentication server 21 can be located in the second zone 20, but it can also be located in a third zone, e.g. a central zone, which is different from the first zone 10 and the second zone 20. The authentication server 21 is connected to a repository 25 in which the database roles for users registered by the authentication server 21 are stored. The authentication server provides identity and access management services to protect the access to the secure JDBC driver 12 on the client side 10. These are presentation-oriented and service-oriented web applications that implement the complex identification and access management processing tasks in the authentication server 21 such as identity management, initial authentication, facilitation of single-sign-on and integration of enterprise security infrastructure. Such identification and access management, in short IAM, services are available on the market based on state-of-the-art standards like openID Connect/OAuth or SAML. In such services, strong authentication can be implemented as part of the solution, e.g. based on a native smartcard driver or one-time-passwords or it can integrate external identity providers, e.g. entitlement services.

The access driver 12 and access proxy 22 use e.g. JDBC type 3 client and server components communicating via http protocol. The access proxy 22 shall only setup a connection 30 to the access driver 12, if the access proxy 22 receives a valid credential, e.g. an IAM-token generated by the IAM services after successful authentication of the user. If the user of the application 14 has the required role to access the database 23 the access proxy 22 establishes a native access connection, e.g. a JDBC connection, to the database 23 and forwards queries to the database 23. The access proxy 22 uses vendor-specific JDBC drivers 26 and does not need to implement access functionalities itself.

Figure 2:
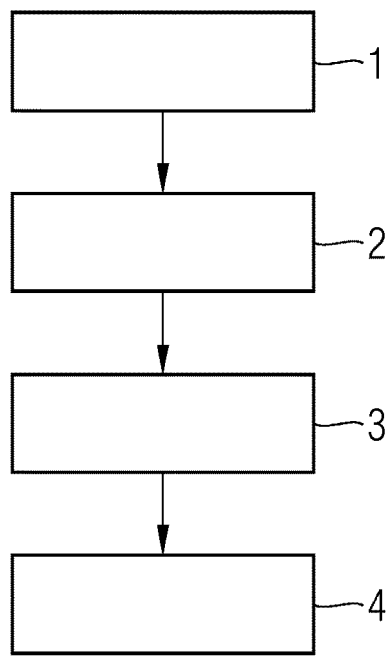
FIG. 2 shows a flow diagram of an embodiment of the inventive method.

The flow diagram in FIG. 2 shows the main method steps to provide a secure database access from a client device 11, which is located in a first zone 10 to a database 23 located in the second zone 20 which is outside the first zone. As a first step 1 an access driver 12 is implemented on the client device 11 and an access proxy 22 is implemented in the second zone wherein the access proxy 22 is connected to the database 23. The user of an application 14 which is implemented on the client device 11 wants to access data on the database 23 requests the access driver 12 to open an access connection. In step 2 an authentication of a user of the application 14 is performed via an authentication agent 13 located on the access driver 12 and the authentication server 21. As already mentioned before, the authentication server 21 provides identity and access management tasks.

In case of a successful authentication a credential from the authentication server 21 is delivered to the access driver 12 in step 3. A credential can be an authentication token or an identity token or an authentication object, e.g. a digital certificate or a onetime password. The credential is cryptographically secured, e.g. it is digitally signed or hashed by a key of a symmetric or asymmetric cryptographic function. The user of the application 14 is allowed to access the database, if the credential is accepted by the access protocol proxy 22, see step 4.

The credential can already be used to set up a secure connection 30 between the access driver 12 and the access proxy 22 e.g. by establishing a connection according a transport layer security protocol TLS. The connection between the authentication agent 13 and the authentication server 21 can be established by a REST application protocol interface e.g. using an http connection.

FIG. 3 shows the authentication step 2 performed between an authentication agent 13 in the access driver 12 in the first zone 10 and an authentication server 21 located in the second zone 20. During the implementation the application 14 registers at the authentication server 21 in order to enable the authentication server 21 to provide IAM services for the application 14.

The authentication agent 13 needs to be configured to input security data e.g. by registering a card reader operation system to input identification information of the user of the application. A user of the application 14 and in consequence also of the database 23 can be a human or a technical device. This action is depicted in FIG. 3 by the arrow labeled with the reference sign 100. On the backend side 20 user accounts, group assignments, and role assigned to the user are synchronized, e.g. periodically, between the authentication server 21 and the access proxy 22, see reference sign 110. User accounts, group assignments, and roles of each user accessing the database 23 can be administrated and stored in the repository 25 and provided to the authentication server 21. Such an IAM repository 25 can be implemented as an LDAP server, or it could also be a database of different structure.

In the depicted example it is assumed that the user identifies itself by a credential, e.g. a digital user certificate UCert, stored on a smartcard and secured by a password or personal identification number PIN. On an access request sent from an application 14 to the access protocol driver 12 the user is requested to input a password to provide access to the user certificate stored in the smartcard. A handshake is performed between authentication agent 13 using information provided by the smartcard and the authentication server 21. This is indicated in FIG. 3 by arrow 120. Subsequently a login request including the user certificate UCert is sent from the authentication agent 13 to the authentication server 21 which responds sending a session identifier S_ID used to set up a secure connection for database access. Further an authorization request is sent from the authentication agent 13 to the authentication server 21. The authentication server 21 responds by sending a credential Cred and roles of the user to the authentication agent who passes them forward to the application protocol driver 12. The access driver 12 informs the application 14 by a response message, see Access Resp in FIG. 3, about a setup of a JDBC/ODBC connection.

FIG. 4 illustrates a database access by the application 14 to the database 23 after the connection has been established as described in FIG. 3. The application 14 requests to execute a database query to the access driver 12. The access driver 12 sends an SQL query and the credential Cred in a http request to the access proxy 22. The access proxy 22 checks the validity of the credential Cred and the user's role indicated. Optionally the access request is logged by storing the sent message in a logging unit 27. According to the access rights and role of the user, the request to execute the SQL query is sent from the access proxy 21 to the database 23. The result of the query, e.g. retrieved data, is delivered from the database 23 to the access proxy 22. The data may optionally be serialized and zipped, refer to 210, and forwarded to the access driver 12 on the client device 14 in the first zone 10. Here the data is unzipped and de-serialized, see 220, and forwarded as query result to the application 14.

The described method and system provides high protection of databases or data warehouses by strong authentication of human or technical users. No database security credentials are required to be stored on the client side. Further on the data transferred between the second zone 20 and the first zone 10 is protected by establishing a secure connection, e.g. by encryption of the communication 30, between the access driver 12 and the access proxy 21. In case the database 23 does not support encrypted communication, unencrypted communication only takes place locally in the second zone 20 between vendor-specific drivers 26 and the database 23 on the connections 28. With this solution legacy applications using traditional database access APIs like JDBC/ODBC do not require any programmatic change as only the access driver 12 is needed on the client side. The access driver 12 just replaces the vendor-specific JDBC driver used previously by the application. The access proxy 22 provides better monitoring by logging database requests without depending on logging functionalities of the database.

Although the present invention has been disclosed in the form of preferred embodiments and variations thereon, it will be understood that numerous additional modifications and variations could be made thereto without departing from the scope of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for providing a secure database access from an application program implemented on a client device located in a first zone to a database located in a second zone, which is outside of the first zone, applying an Open Database Connectivity ODBC or a JAVA Database Connectivity JDBC application programming Interface as a traditional database access application programming interface, the method comprising:
    implementing a database access driver on the client device in the first zone and implementing a database access proxy in the second zone, which is connected to the database,
    performing an authentication of a user of the application program via an authentication agent located on the database access driver and an authentication server located in the second zone or in a third zone other than the first or second zone,
    delivering a credential and a role of the user for accessing the database from the authentication server to the database access driver in response to a successful authentication,
    sending the credential and the role of the user from the database access driver to the database access proxy, and
    enabling database access to the user of the application program in response to the credential and the role of the user being accepted by the database access proxy, wherein the authentication server and the database access proxy periodically synchronize the role of the user for accessing the database.

2. The method according to claim 1, wherein the credential is a cryptographically secured credential.

3. The method according to claim 1, wherein the authentication server is located in the second zone or in a third zone other than the first of second zone, wherein the third zone is a central zone.

4. The method according to claim 1, wherein the database access protocol interface is performed by at least one vendor-specific driver in the database access proxy.

5. The method according to claim 1, wherein access rights of a user of the application program requesting access to the database are checked on the database access proxy.

6. The method according to claim 1, wherein access rights of a user of the application program stored in the database access proxy are updated by the authentication server.

7. The method according to claim 1, wherein access rights of a user of the application program requesting access to the database are administered on the authentication server, wherein the administration is on a repository connected to the authentication server.

8. The method according to claim 1, wherein the application program is registered at the authentication server during deployment of the application program on the client device.

9. The method according to claim 1, wherein operations performed by the database access proxy are logged by a logging unit.

10. The method according to claim 1, wherein data is transmitted on a secure second connection between the database access proxy and the database.

11. The method according to claim 1, wherein the third zone is a central zone.

12. A system providing a secure database access from an application program implemented on a client device in a first zone to a database located in a second zone different from the first zone, applying an Open Database Connectivity ODBC or a JAVA Database Connectivity JDBC application programming Interface as a traditional database access application programming interface, comprising
  a database access protocol interface driver including an authentication agent the database access protocol interface driver being implemented on the client device in the first zone,
  a database access proxy being connected to a data base and located in the second zone, wherein the database access driver and the database access proxy are implemented for
    performing an authentication of a user of the application program via an authentication agent located on the database access driver and an authentication server located in the second zone or in a third zone other than the first or second zone,
    delivering a credential and a role of the user for accessing the database from the authentication server to the database access driver in response to a successful authentication,
    sending the credential and the role of the user from the database access driver to the database access proxy, and
    enabling database access to the user of the application program, in response to the credential and the role of the user are accepted by the database access proxy,
    wherein the authentication server and the database access proxy periodically synchronize the role of the user for accessing the database.

13. The system according to claim 12, wherein the third zone is a central zone.

14. A computer program product, comprising a computer readable hardware storage device having computer readable program code stored therein, said program code executable by a processor of a computer system to implement a method for providing a secure database access from an application program implemented on a client device located in a first zone to a database located in a second zone, which is outside of the first zone, applying an Open Database Connectivity ODBC or a JAVA Database Connectivity JDBC application programming Interface as a traditional database access application programming interface, the method comprising:
  implementing a database access driver on the client device in the first zone and implementing a database access proxy in the second zone, which is connected to the database,
  performing an authentication of a user of the application program via an authentication agent located on the database access driver and an authentication server located in the second zone or in a third zone other than the first or second zone,
  delivering a credential and a role of the user for accessing the database from the authentication server to the database access driver in response to a successful authentication,
  sending the credential and the role of the user from the database access driver to the database access proxy, and
  enabling database access to the user of the application program in response to the credential and the role of the user being accepted by the database access proxy, wherein the authentication server and the database access proxy periodically synchronize the role of the user for accessing the database.

15. The computer program product according to claim 14, wherein the third zone is a central zone.

* * * * *